United States Patent
Keret et al.

(10) Patent No.: US 11,875,049 B2
(45) Date of Patent: Jan. 16, 2024

(54) AUTOMATIC STORAGE MANAGEMENT IN NETWORKED DATA STORAGE SYSTEMS USING STORAGE DEVICE MONITORING

(71) Applicant: NICE LTD., Ra'anana (IL)

(72) Inventors: Matan Keret, Oulu (FI); Olga Chukhriaieva, Vinnitsya (GB); Sergii Lebid, Vinnitsa (GB)

(73) Assignee: NICE LTD., Ra'anana (IL)

( * ) Notice: Subject to any disclaimer, the term of this patent is extended or adjusted under 35 U.S.C. 154(b) by 233 days.

(21) Appl. No.: 17/669,511

(22) Filed: Feb. 11, 2022

(65) Prior Publication Data

US 2023/0259292 A1 Aug. 17, 2023

(51) Int. Cl.
*G06F 3/06* (2006.01)
*G06N 20/00* (2019.01)

(52) U.S. Cl.
CPC ............ *G06F 3/0635* (2013.01); *G06F 3/067* (2013.01); *G06F 3/0613* (2013.01); *G06F 3/0617* (2013.01); *G06F 3/0659* (2013.01); *G06N 20/00* (2019.01)

(58) Field of Classification Search
CPC .... G06F 3/0635; G06F 3/0613; G06F 3/0617; G06F 3/0659; G06F 3/067; G06F 3/0631; G06F 3/0638; G06N 20/00
See application file for complete search history.

(56) References Cited

U.S. PATENT DOCUMENTS

| | | | |
|---|---|---|---|
| 2023/0055079 A1* | 2/2023 | Wu | H04L 47/824 |
| 2023/0139003 A1* | 5/2023 | Bhasme | B60L 15/2045 |
| | | | 701/533 |

* cited by examiner

*Primary Examiner* — Ernest Unelus
(74) *Attorney, Agent, or Firm* — Haynes and Boone, LLP (57) ABSTRACT

A data storage system configured to optimize selection of a plurality of data storage devices. The system includes a processor and a computer readable medium operably coupled thereto, the computer readable medium including a plurality of instructions stored in association therewith that are accessible to, and executable by, the processor, to perform storage device selection operations which include detecting and gathering storage device information for storing data recordings to the plurality of data storage devices, determining, by a storage load balancer, a plurality of storage efficiency scores for the plurality of data storage devices using a loss function and the gathered storage device information, generating a storage efficiency table, and assigning, by the storage load balancer, a first data recording to one of the plurality of data storage devices based on the storage efficiency table and an efficiency score threshold for the plurality of storage efficiency scores.

17 Claims, 6 Drawing Sheets

AUTOMATIC STORAGE MANAGEMENT IN NETWORKED DATA STORAGE SYSTEMS USING STORAGE DEVICE MONITORING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to networked data storage systems having disparate data storages and data recorders, and more specifically to a system and method for automating and optimizing storage management on different storage devices based on changing storage attributes and statistics.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

When customers interact with different computing systems of a service provider, such as sales or purchasing systems, customer relationship management (CRM) systems, service or help systems, information systems, and the like, the customers may engage with live agents via voice communications including phone calls, video conferences, and the like. These customers may correspond to individual users and/or users of an organization that may want to utilize CRM systems to utilize certain services and/or data, for example, computing services that the users have enrolled in and/or purchased, data the user has stored or generated, and/or previous activity the user has performed with the service provider's systems. During voice communications, such as communications over a publicly switched telephone network (PSTN), cellular network, voice over IP (VoIP), voice over LTE (VoLTE), and/or voice communications over data networks, live agents may engage with customers to provide assistance and services. When engaging in voice communications, calls that include audio and/or video may be recorded, and further may be persisted to one or more databases for later use, playback, training, and the like. Thus, CRM systems and other service providers may interact with storage and archiving systems, which may utilize distributed data recorders and storage databases and/or devices over a network.

However, in conventional data storage systems, storage management is done manually by administrators of the data storage systems. Administrator configuration may include setting storage devices for certain data centers, data recorders, and the like based on storage capacity and/or other static parameters, attributes, and information available to the administrators. These administrators may consider the required capacity by certain data recorders with individual storage devices and/or larger storage volumes in group storage. Conventional data storage configuration and management does not consider performance of devices and/or network conditions that may change over time. For example, poor or good network conditions, storage space, underlying storage, operating system (OS) behavior, and the like may affect storage availability and throughput. Recording requests and tasks may have different volumes and/or traffic at different times and therefore certain hours, days, weeks, or other time periods may be busier, such as peak or busy hours and off or vacant hours. Location of data recorders and/or storage devices may also matter for different data storage requesters. A conventional approach that is static and does not account for variable conditions and information has been discovered not to optimize data storage management. Thus, conventional systems do not provide optimal speed and efficiency in data archiving.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In order to provide for automatic storage management for data recordings and other data storage tasks and requests, a data storage and management system may utilize storage device selection operations to monitor data recorders and connected storage devices in a distributed system to optimize and/or configure storage of data recordings. Different data recordings may correspond to calls to a call center or CRM system, including audio and/or video of a communication session between one or more users and one or more agents. However, data recordings may more generally correspond to any data that may be recorded in a database or other storage device. A distributed storage system may include multiple data recorders, which record and/or receive recordings of call media or other data. The distributed storage system may further include multiple storage devices, which may correspond to hardware and/or software where data may persist for significant periods of time (e.g., 20-30 years or more) and may allow archiving and retrieval of data recordings and other data. The distributed system may be distributed over many nodes, such as data recorders and connected or associated storage devices, as well as over a geographic area.

In one example, the distributed system may be distributed in locations across the United States and have data recorders and storage devices assisting data storage and archiving for call centers in different locations across the United States. In such an example, a data recorder may capture call media during a communication session. Thereafter, an archiving decision may be made, such as based on archiving policies and/or recording metadata, and the data recording is persisted to the corresponding storage device. This process may be performed in conjunction with additional computing operations and components, such as a media management layer, an interaction center, a message broker and/or messenger, and/or an archiving worker. After archiving, an archiving result, such as an event object, may be generated, and may be published to the data storage system.

Conventionally, the decision of assignment of a data recording to a storage device for storage is determined based on an administrative setup and configuration (e.g., static policies and/or designations). As discussed herein, a dynamic, automatic, and optimized data storage management may be provided using a storage load balancer (SLB) on one or more servers managing the data storage system, which interacts with storage monitoring services (SMSs) residing locally on data recorders. In this regard, an SMS on a data recorder may continuously or periodically (e.g., at certain time intervals and/or after a time period) monitor and gather data for storage devices used by and/or associated with the data recorder. This may include statistics related to storage device's connection speed, stability, data storage capacity, and the like. These statistics may then be exposed by each connected data recorder (and corresponding SMS) to the SLB, which may manage data storage requests and storage of data recordings.

The SLB may gather the connection statistics from the SMSs in order to monitor storage devices for storage device information. The SLB may further monitor parameters and attributes of the storage devices, such as free space, storage utilization rate, input/output operations per second (IOPS), latency, throughput, load, and other relevant information to performance, availability, connectivity, and/or stability of data storage devices. Thus, the SLB may account for data for storage devices and data recorders that may change between peak or busy hours and off hours. When assigning and distributing storage among data recorders and corresponding data storages, the SLB may generate one or more storage efficiency tables (SETs) using corresponding logic. For example, a storage efficiency calculation may utilize a loss function where a value or score may be calculated for each storage device based on the collected statistics. The values or scores may then be compared to identify a most beneficial or efficient storage device for a specific storage request and/or data recording. A threshold may be implemented to automatically remove certain storage devices that are suboptimal and/or too inefficient for use.

The SLB may also utilize one or more machine learning (ML) or other artificial intelligence (AI) models and/or operations using the storage efficiency calculation and/or SET generation and use. For example, an ML model may be trained to classify a storage device for selection by a data recorder and/or the distribution of data recordings on a system level based on past distributions and/or determination by the SLB and storage efficiency calculation. This may allow for automated storage management that proactively distributes data storage in an optimized and efficient manner without manual intervention.

The embodiments described herein provide methods, computer program products, and computer database systems for automated storage management in data storage systems having distributed data recorders and storage devices. A service provider system may therefore include a data storage system that may monitor and gather storage device statistics using SMSs on data recorders. The system may then perform storage distribution using an SLB that generates one or more SETs for the storage device statistics using a storage efficiency calculation. Once one or more storage devices are selected, assignment of a data recording or other data storage request may be performed to persist data to the selected storage device(s).

According to some embodiments, in a data storage system accessible by a plurality of separate and distinct organizations, storage efficiency calculation and automatic storage management is provided for identifying, predicting, and assigning data storage to disparate data storage devices, thereby optimizing data storage operations, and providing faster and more efficient data storage.

Example Environment

Figure 1:
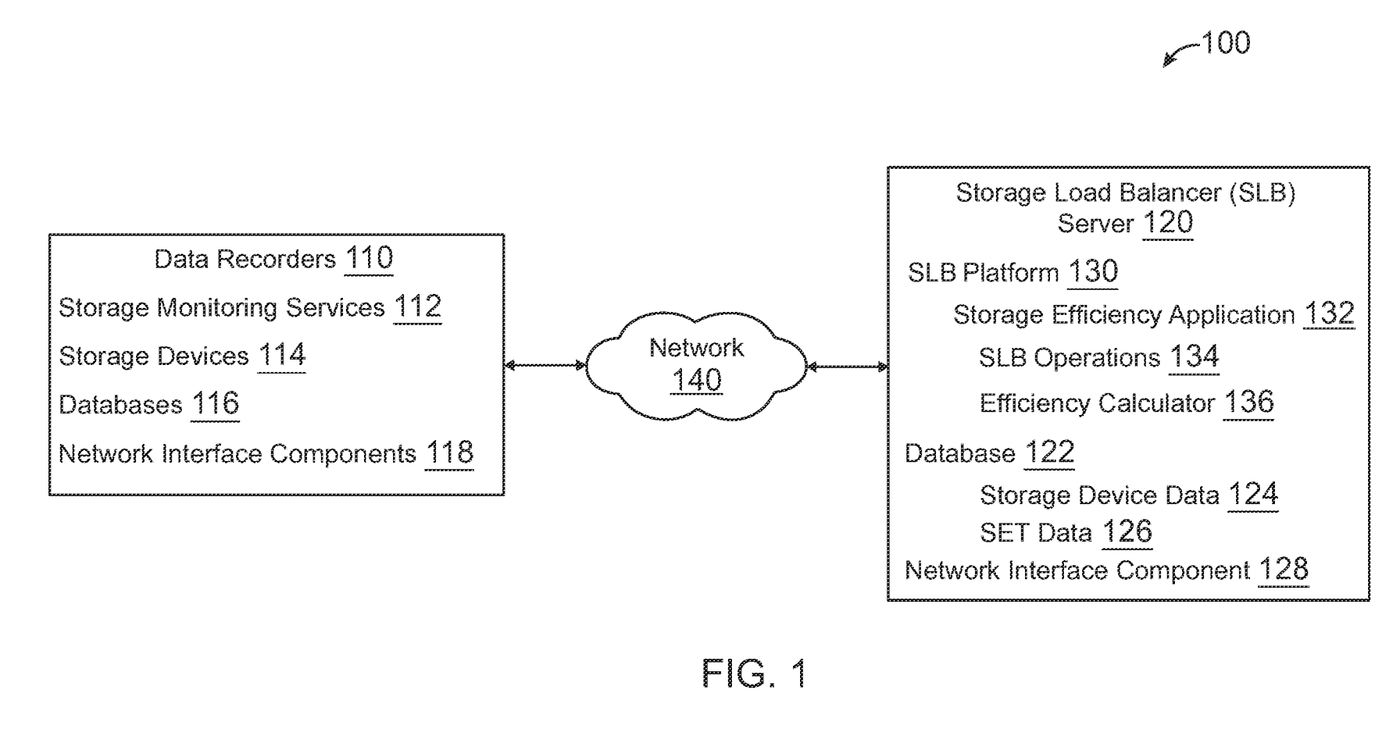
FIG. 1 is a simplified block diagram of a networked environment suitable for implementing the processes described herein according to an embodiment.

The system and methods of the present disclosure can include, incorporate, or operate in conjunction with or in the environment of an automatic data storage system, which may include an SLB that interacts with SMSs at data recorders for automatic, efficient, and optimized distribution of storage using SETs. FIG. 1 is a block diagram of a networked environment 100 suitable for implementing the processes described herein according to an embodiment. As shown, environment 100 may include or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, cloud-based architectures have been developed to improve collaboration, integration, and community-based cooperation between users without sacrificing data security. Similarly, ML and AI architectures have been developed to improve predictive analysis and classifications by systems in a manner similar to human decision-making, which increases efficiency and speed in performing predictive analysis, such as those during distribution of storage. One or more devices and/or servers may be operated and/or maintained by the same or different entities.

FIG. 1 illustrates a block diagram of an example environment 100 according to some embodiments. Environment 100 may include data recorders 110 and an SLB server 120 that interact to provide automated storage management using SETs for storage distribution. In other embodiments, environment 100 may not have all of the components listed and/or may have other elements instead of, or in addition to, those listed above. In some embodiments, the environment 100 is an environment in which data storage distribution may be performed through a data storage system. As illustrated in FIG. 1, SLB server 120 might interact via a network 140 with data recorders 110, which generate, provide, and output statistics for SLB server 120 to provide automated storage management.

SLB server 120 may be utilized in order to determine one or more distributions of data recordings and other data storage requests using statistics and other data sets for storage device parameters provided by data recorders 110 and/or detected by SLB server 120. SLB server 120 may first receive and gather these statistics from data recorders 110 in order to provide storage distribution. Data recorders 110 may correspond to a single recorder device, server, or other component that may interface with a call center, CRM system, or other data center that generates data for recording. Additionally, data recorders 110 may, in some embodiments, correspond to the same or different entity having different data for storing and archiving. Data recorders 110 may therefore record data and/or receive a data recording, such as audio and/or video media content from a call. Data recorders 110 may then be responsible for storing and/or archiving the data recordings and/or other data using storage devices 114. In this regard, SMSs 112 may interact with storage devices 114, for example, to gather storage connection parameters and monitor the connection parameters including speed, stability, network usage/bandwidth, network load, and the like. This may be done periodically or continuously, and SMSs 112 may also periodically or continuously gather and report storage performance parameters for storage devices 114. Such data may be stored to databases 116 and/or may be streamed or otherwise provided to SLB server 120.

Data recorders 110 may transmit the connection and/or performance statistics for storage devices 114 to SLB server 120, which may be stored by database 122 with storage device data 124. SLB server 120 includes an SLB platform 130 having a storage efficiency application 132 configured to calculate storage efficiency and generate SET data 126 for one or more tables having storage efficiency values or scores for each of storage devices 114. In this regard, storage efficiency application 132 includes SLB operations 134 to gather data, including the data from SMSs 112 of data recorders 110 and additional storage device data of storage devices 114. SLB operations 134 may further monitor and gather data on storage device availability, performance, and/or stability from storage devices 114 including free space, storage utilization rate, IOPS, latency, throughput, load, etc. The gathered data may be stored with storage device data 124 and may include, for each of storage devices 114, at least a connection parameter, a performance parameter, a storage utilization rate, a data storage throughput, a storage availability, a storage free space, a recording rate, a storage location, or a combination thereof.

Storage device data 124 may be processed to determine data for variables of a loss function used to generate values or scores for each of storage devices 114 at a point in time where data recordings or other data is to be distributed for storage. For example, storage efficiency application 132 of SLB platform 130 further includes an efficiency calculator 136 that may generate SET data 126 based on the gathered data and a loss function or other operation, including ML models and engines. When determining SET data 126, storage device data 124 may be used to determine, for a particular loss function, a utilization rate of each of storage devices 114, a recording rate of each of data recorders 110, a throughput from each of data recorders 110 to a corresponding one of storage devices 114, a free space on each of storage device 114, and/or an availability rate of each of storage devices 114 from a corresponding one of data recorders 110.

These percentage or other values may be used to calculate a score or value for data distribution and storage for each of storage devices 114. Once generated, the data may be added to a corresponding cell for a data record row and/or column in a corresponding storage efficiency data table of SET data 126. After generating of SET data 126 from storage device data 124 with SLB operations 134 and efficiency calculation 136, SLB operations 134 may distribute storage of data recordings and/or other requested data according to SET data 126. A threshold may be implemented to bar usage of certain devices. Further, a preference for lower or better scored ones of storage devices 114 may be given to larger data storage jobs or requests. Locations of each of data recorders 110 and/or storage devices 114 may be used to provide preference and/or select a particular one of storage devices 114, and SET data 126 may include SETs for specific locations, regions, and/or location pools of storage devices.

One or more client devices and/or servers may execute a web-based client that accesses a web-based application for SLB server 120, or may utilize a rich client, such as a dedicated resident application, to access SLB server 120. These client devices may utilize one or more application programming interfaces (APIs) to access and interface with SLB server 120 in order to schedule, review, and revise data storage requests and/or data storage operations using SLB platform 130 and SET data 126, for example, using the operations discussed herein. Interfacing with SLB server 120 may be provided through an application and may be based on data stored by a database, SLB server 120, and/or data recorders 110. The client devices might communicate with SLB server 120 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Communication between the client devices and SLB server 120 may occur over network 140 using a network interface component of the client devices and a network interface component of SLB server 120. In an example where HTTP/HTTPS is used, the client devices might include an HTTP/HTTPS client commonly referred to as a "browser" for sending and receiving HTTP//HTTPS messages to and from an HTTP// HTTPS server, such as SLB server 120 via the network interface component. Similarly, SLB server 120 may host an online platform accessible over network 140 that communicates information to and receives information from the client devices. Such an HTTP/HTTPS server might be implemented as the sole network interface between the client devices and SLB server 120, but other techniques might be used as well or instead. In some implementations, the interface between the client devices and SLB server 120 includes load sharing functionality. As discussed above, embodiments are suitable for use with the Internet, which refers to a specific global internet of networks. However, it should be understood that other networks can be used instead of the Internet, such as an intranet, an extranet, a virtual private network (VPN), a non-TCP/IP based network, any LAN or WAN, or the like.

The client devices may utilize network 140 to communicate with SLB server 120, as well as data recorders 110, which is any network or combination of networks of devices that communicate with one another. For example, the network can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol.

According to one embodiment, SLB server 120 is configured to provide webpages, forms, applications, data, and media content to the client devices and/or to receive data from the client devices. In some embodiments, SLB server 120 may be provided or implemented in a cloud environment, which may be accessible through one or more APIs with or without a correspond graphical user interface (GUI) output. SLB server 120 further provides security mechanisms to keep data secure. Additionally, the term "server" is meant to include a computer system, including processing hardware and process space(s), and an associated storage system and database application (e.g., object-oriented database management system (OODBMS) or relational database management system (RDBMS)). It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

In some embodiments, data recorders 110, shown in FIG. 1, execute processing logic with processing components to provide data used for automated data storage discussed herein. For example, in one embodiment, data recorders 110 includes application servers configured to implement and execute software applications as well as provide related data, code, forms, webpages, platform components or restrictions, and other information associated with data sets used for automated data storage and/or storage device statistics, and to store to, and retrieve from, a database system related data, objects, and web page content associated with automated data storage and/or storage device statistics. For example, SLB server 120 may implement various functions of processing logic and processing components, and the processing space for executing system processes, such as running applications for automated data storage. Data recorders 110 may be accessible over network 140. Thus, SLB server 120 may send and receive data to one or more of data recorders 110 via network interface component 128, and data recorders 110 may send and receive data to SLB server 120 using network interface components 118. Data recorders 110 may be provided by one or more cloud processing platforms, such as Amazon Web Services® (AWS) Cloud Computing Services, Google Cloud Platform®, Microsoft Azure® Cloud Platform, and the like, or may correspond to computing infrastructure of an entity, such as a storage service provider.

Several elements in the system shown and described in FIG. 1 include elements that are explained briefly here. For example, the client devices could include a desktop personal computer, workstation, laptop, notepad computer, PDA, cell phone, or any wireless access protocol (WAP) enabled device or any other computing device capable of interfacing directly or indirectly to the Internet or other network connection. The client devices may also be a server or other online processing entity that provides functionalities and processing to other client devices or programs, such as online processing entities that provide services to a plurality of disparate clients.

The client devices may run an HTTP/HTTPS client, e.g., a browsing program, such as Microsoft's Internet Explorer or Edge browser, Mozilla's Firefox browser, Opera's browser, or a WAP-enabled browser in the case of a cell phone, tablet, notepad computer, PDA or other wireless device, or the like. According to one embodiment, the client devices and all of its components are configurable using applications, such as a browser, including computer code run using a central processing unit such as an Intel Pentium® processor or the like. However, the client devices may instead correspond to a server configured to communicate with one or more client programs or devices, similar to a server corresponding to SLB server 120 that provides one or more APIs for interaction with the client devices for automated data storage.

Thus, data recorders 110 and/or SLB server 120 (as well as any client devices) and all of their components might be operator configurable using application(s) including computer code to run using a central processing unit, which may include an Intel Pentium® processor or the like, and/or multiple processor units. A server for data recorders 110 and/or SLB server 120 may correspond to Window®, Linux®, and the like operating system server that provides resources accessible from the server and may communicate with one or more separate user or client devices over a network. Exemplary types of servers may provide resources and handling for business applications and the like. In some embodiments, the server may also correspond to a cloud computing architecture where resources are spread over a large group of real and/or virtual systems. A computer program product embodiment includes a machine-readable storage medium (media) having instructions stored thereon/ in which can be used to program a computer to perform any of the processes of the embodiments described herein utilizing one or more computing devices or servers.

Computer code for operating and configuring data recorders 110 and/or SLB server 120 to intercommunicate and to process webpages, applications and other data and media content as described herein are preferably downloaded and stored on a hard disk, but the entire program code, or portions thereof, may also be stored in any other volatile or non-volatile memory medium or device, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

Storage Efficiency Operations

Figure 2:
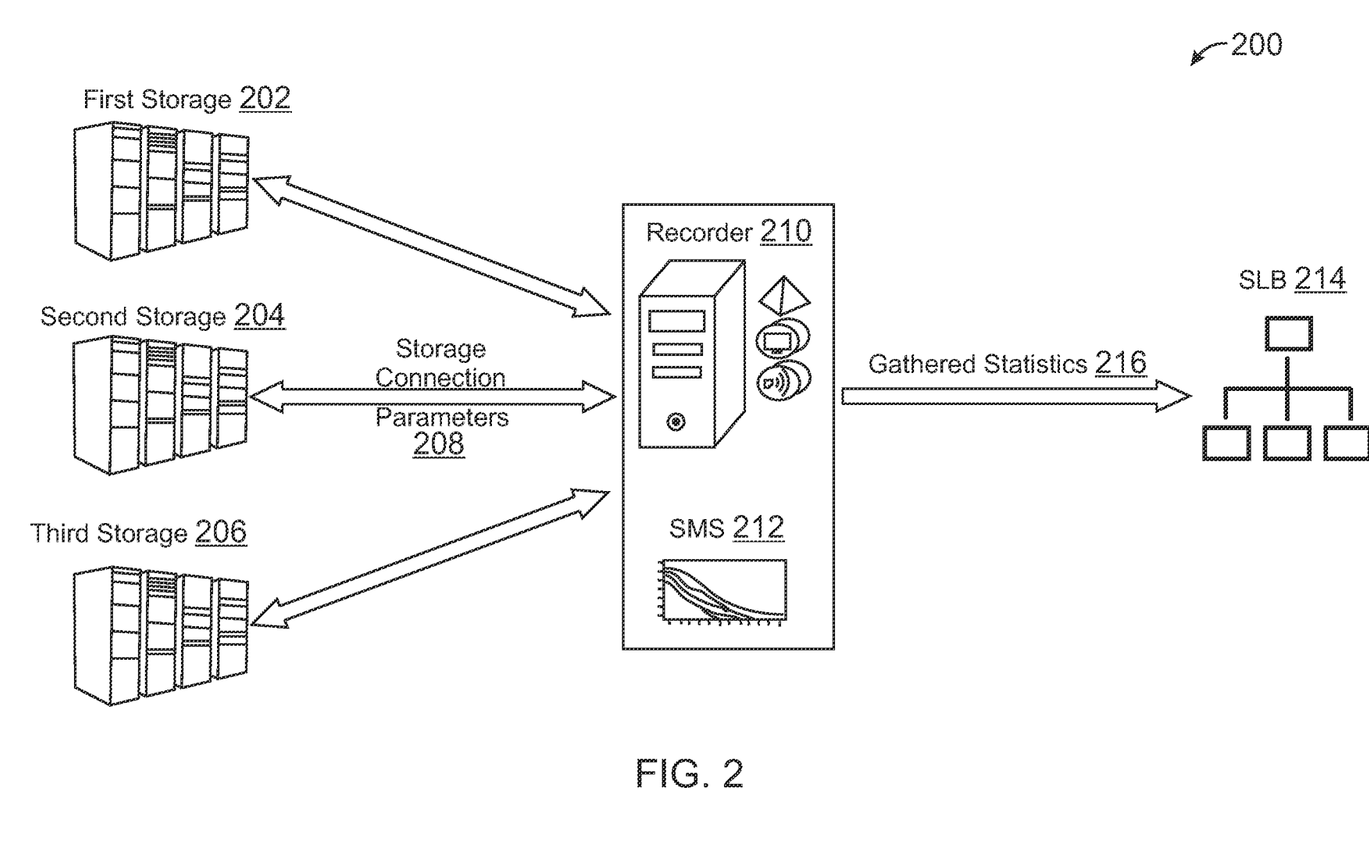
FIG. 2 is a simplified block diagram of a storage monitoring service on a data recorder used to generate statistics on storage device information for connected storage devices according to some embodiments.

FIG. 2 is a simplified block diagram 200 of a storage monitoring service on a data recorder used to generate statistics on storage device information for connected storage devices according to some embodiments. Diagram 200 of FIG. 2 includes components and operations performed by a recorder 210 with an SMS 212, which may correspond to one of data recorders 110 and one of SMSs 112, respectively, discussed in reference to environment 100 of FIG. 1. In this regard, diagram 200 displays data operations and resulting data sets of statistics for data storage connectivity and/or performance monitored by SMS 112 residing locally on data recorder 110. Thus, the resulting statistics and other data may be provided for automatic storage management and distribution.

In diagram 200, recorder 210 may be connected with a first storage 202, a second storage 204, and a third storage 206, where SMS 212 on recorder 210 functions to monitor, record, store, and/or transmit data to an SLB 214 for first storage 202, second storage 204, and third storage 206. Recorder 210 may correspond to a data recorder, which may be connected to and/or in communication with a call center or other data center to capture and/or record media data (e.g., phone or other medium calls that include voice audio and/or video) or other data, or may receive recordings of such data. Recorder 210 may therefore obtain data recordings, which are to be persisted to one or more of first storage 202, second storage 204, and third storage 206 based on automated archiving and storage distribution as determined by SLB 214. SLB 214 may correspond to SLB server 120 discussed in reference to FIG. 1 and may provide automated storage distribution based on monitored data and storage efficiency calculations and decisions.

SMS 212 of recorder 210 may therefore monitor connection/connectivity and/or performance parameters and other information for each of first storage 202, second storage 204, and third storage 206. For example, connection parameters for first storage 202, second storage 204, and third storage 206 may include those associated with connection speed and stability with first storage 202, second storage 204, and third storage 206, such as ping, download/upload speed, connection stability and/or packet loss or drop rate, latency, throughput, and the like. Performance parameters for first storage 202, second storage 204, and third storage 206 may include processing load, availability, whether offline/online, any service requests and/or full/partial offline for patching or servicing, and the like.

Thus, storage connection parameters 208, as well as any additional performance parameters, are monitored and gathered by SMS 212. SMS 212 may monitor this data over a time period and determine connectivity and/or performance statistics for each of first storage 202, second storage 204, and third storage 206, as well as all data storages linked to recorder 210. SMS 212 may then provide gathered statistics 216 to SLB 214, such as at periodic time intervals or at a start/expiration of a selected time period. In some embodiments, SMS 212 may also stream gathered statistics 216 to SLB 214, for example, in real-time or near real-time. SLB 214 may then utilize gathered statistics 216 with additional data for first storage 202, second storage 204, third storage 206, and/or other data storages for generation of one or more SETs using a loss function or other efficiency calculation process, as discussed in further detail with regard to FIGS. 3-5 below.

Figure 3:
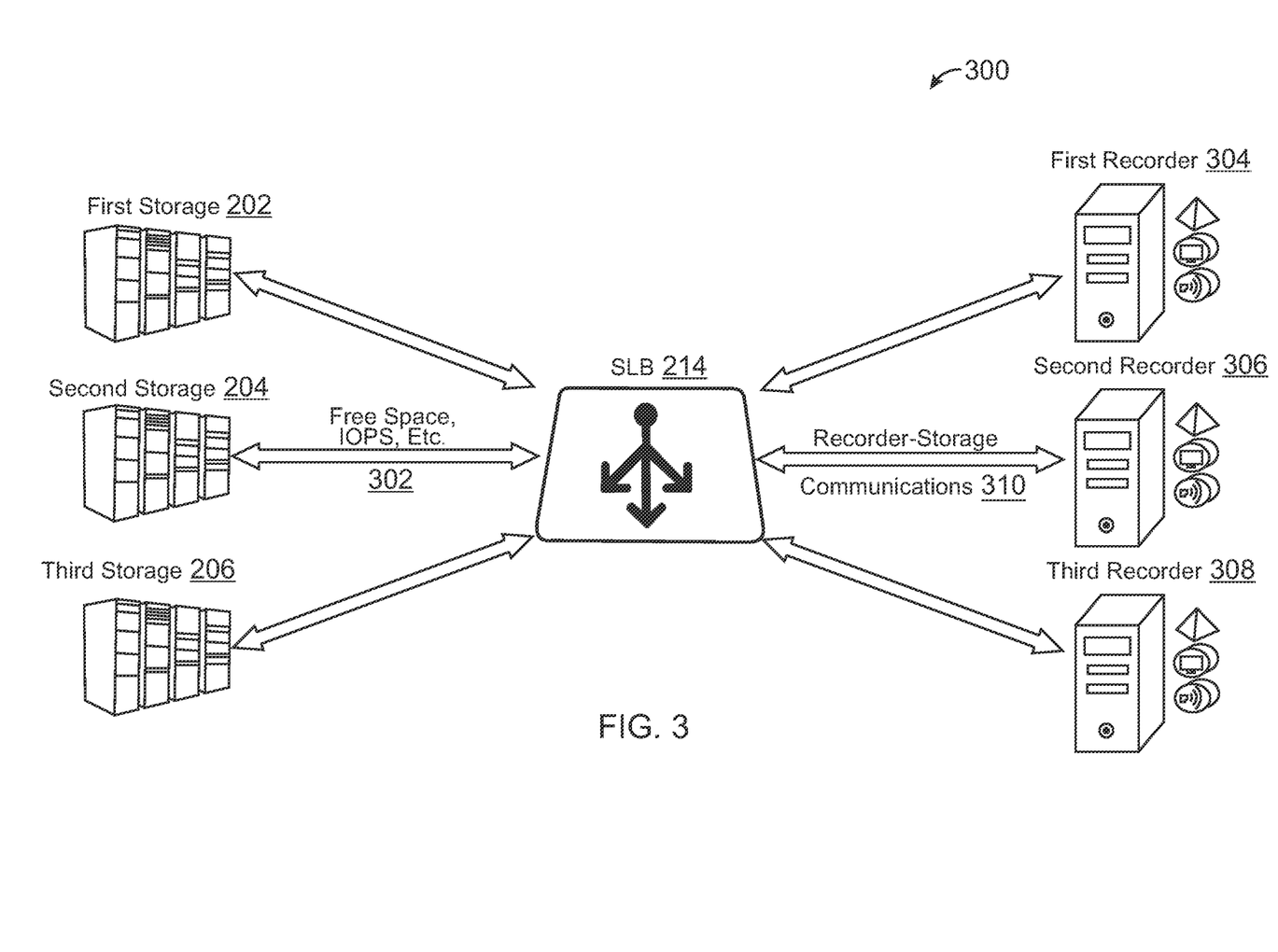
FIG. 3 is a simplified diagram of a storage load balancer that gathers statistics from storage monitoring services and monitors storage devices for distributing data storage requests and data to different data recorders according to some embodiments.

FIG. 3 is a simplified diagram 300 of a storage load balancer that gathers statistics from storage monitoring services and monitors storage devices for distributing data storage requests and data to different data recorders according to some embodiments. Diagram 300 of FIG. 3 includes components and operations performed by an SLB 214 when engaging with multiple data storages and data recorders, where SLB 214 is discussed in reference to diagram 200 of FIG. 2 and may correspond to SLB server 120 discussed in reference to environment 100 of FIG. 1. In this regard, diagram 300 displays data operations and resulting data sets for SETs that may be utilized for distribution of data storage requests and processes. Thus, SLB 214 may gather statistics and other data for automatic storage management and distribution.

In diagram 300, SLB 214 may interact and/or monitor first storage 202, second storage 204, and third storage 206 in order to determine additional data storage information for first storage 202, second storage 204, and third storage 206. For example, the additional data storage information 302 may include free space, storage utilization rate, IOPS, load, etc. Additional data storage information 302 may be associated with a connection parameter, a performance parameter, a storage utilization rate, a data storage throughput, a storage availability, a storage free space, a recording rate, a storage location, or a combination thereof. Thus, with the information provided by SMS 212 and additional data storage information 302 monitored by SLB 214, SLB 214 may determine data storage information necessary to generate one or more SETs for distribution of storage over at least first storage 202, second storage 204, and third storage 206. The data storage information for first storage 202, second storage 204, third storage 206 and/or other data storages may include a storage utilization rate, a throughput, a storage availability, a storage free space, a recording rate, and/or a storage location.

SLB 214 may be in communication with multiple data recorders in order to determine the connection and performance parameters of different data storages, storage nodes, and the like in a distributed data storage system. In this regard, SLB 214 may also communicate with a first recorder 304, a second recorder 306, and a third recorder 308 to receive recorder-storage communications 310. First recorder 304, second recorder 306, and third recorder 308 may each include an SMS similar to SMS 212 in diagram 200 of FIG. 2 that provides statistics and other data for recorder-storage communications 310 to SLB 214. Thus, recorder-storage communications 310 from first recorder 304, second recorder 306, and third recorder 308 may further be used when generating one or more SETs for distribution of storage over first storage 202, second storage 204, third storage 206 and/or other data storages.

Figure 4:
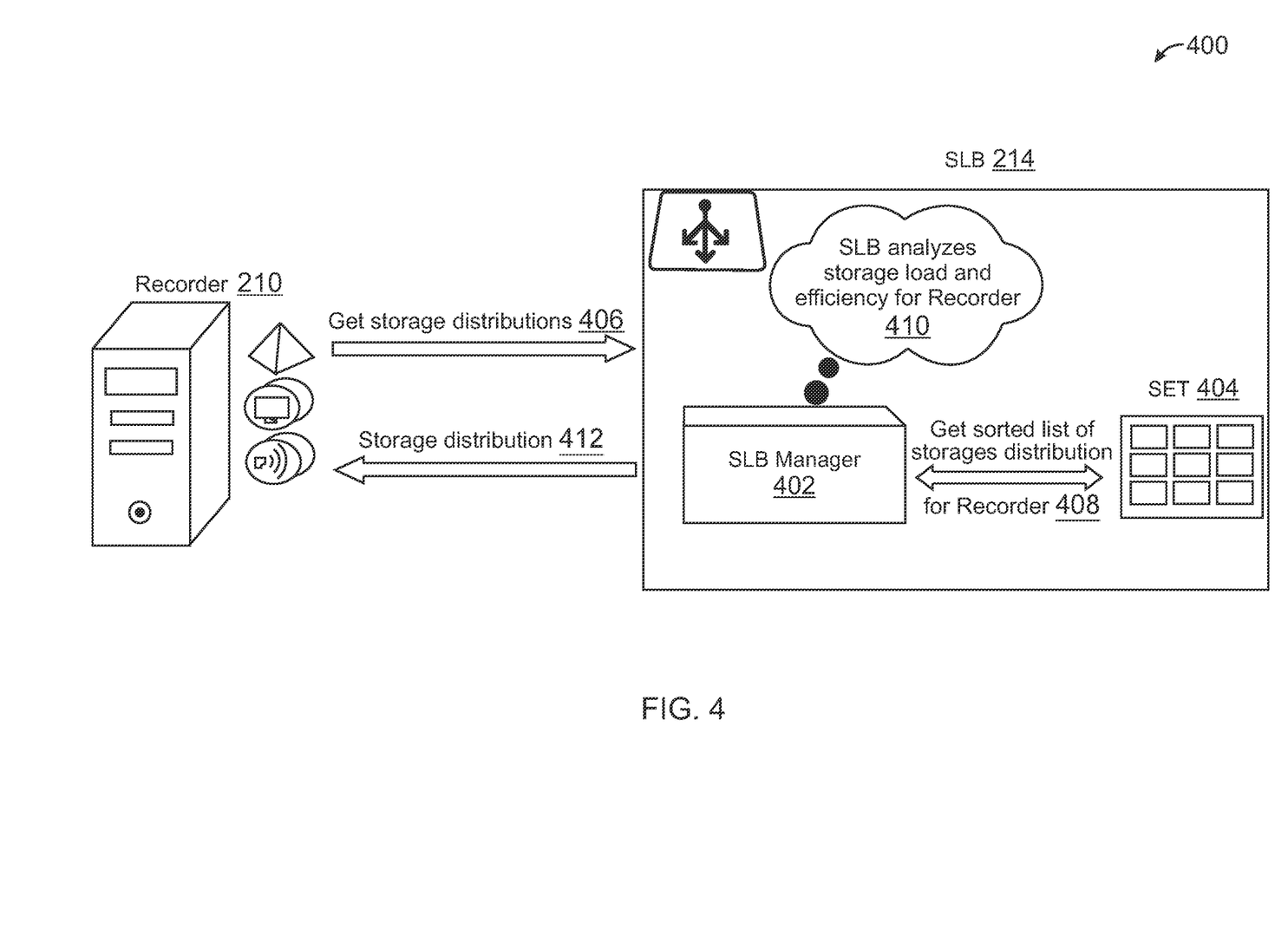
FIG. 4 is a simplified diagram of a logic flow utilized by storage monitoring services and a storage load balancer for distribution of recordings and other data storage requests among data recorders according to some embodiments.

FIG. 4 is a simplified diagram 400 of a logic flow utilized by storage monitoring services and a storage load balancer for distribution of recordings and other data storage requests among data recorders according to some embodiments. Diagram 400 of FIG. 4 includes a logic flow or diagram on interacting components, such as those discussed in reference to environment 100 of FIG. 1 and diagrams 200 and 300 of FIGS. 2 and 3, respectively. In this regard, diagram 400 displays interactions between recorder 210 when obtaining storage distributions for data storage on storage devices, which is determined by SLB 214 using an SLB manager 402 based on previously gathered data and computed values in an SET 404. Thus, SET 404 may be used by SLB manager 402 for automatic storage management and distribution with recorder 210.

Diagrams 200 and 300 include the components and operations for data monitoring, gathering, and collection by SLB 214, where the gathered data may be used for SET generation and automatic storage management and distribution in an intelligent and efficient manner. In diagram 400, SLB 214 may generate SET 404, which may be used by SLB manager 402 for this automatic storage distribution and management. When generating SET 404, parameters determined based on the gathered storage device information, such as a storage utilization rate, a throughput, a storage availability, a storage free space, a recording rate, and/or a storage location may be used with the following loss function, which may be used for a storage efficiency calculation of each storage device. Although a loss function is described below, other functions for determining storage efficiency of each storage device in a distributed data storage system may be used.

Each recorder Ri may have a corresponding archiving worker within, and SLB 214 may calculate the loss function for all available or connected storage devices Sj as follows:

Equations 1

For each recorder Ri, SLB 214 may calculate a loss function against all storage device Sj:

$$\mathrm{Loss}(Ri, Sj) = \frac{\mathrm{Var}(\mathrm{Utilization}(S)) + \mathrm{Var}(\mathrm{Rec}(R)) + C}{(Th(Sj, Ri) + \mathrm{Space}(Sj) + \mathrm{Avail}(Sj, Ri))}$$

Where:
Utilization(S)=The utilization rate of every storage device in S expressed as a percentage.
Rec(R)=The recording rate on every recorder in R expressed as a percentage.
C=A constant for edge cases where the numerator may be zero.
Th(Sj, Ri)=Throughput from recorder Ri to storage device Sj expressed as a percentage.
Space(Sj) =Free space of storage device Sj expressed as a percentage.
Avail(Sj, Ri)=Availability rate of storage device Sj from recorder Ri expressed as a percentage.

Variance may be calculated as follows:

$$\mathrm{Var}(X) = \frac{\sum_{i=1}^{n}(Xi - \mu)^2}{n}$$

Additional inputs may also be added to the loss function in Equations 1, including cost, bandwidth limits, etc. Additionally, location may be a factor where a location setting may be given to every recorder R and storage device S. The calculation above may be done with each location and/or location pool of machines.

The loss function and corresponding input data may be used to determine output values or scores for storage devices associated with a corresponding recorder. The output of the loss function may correspond to a value that indicates an efficiency or optimization of providing a data recording or other data storage request and task from a data recorder to a particular storage device (connected or in communication with that data recorder) in the distributed data storage system. The lower the value using Equations 1, the more efficient or optimized the storage device may be for that particular data recorder. Further, a threshold may be implemented, where values for data storages over the threshold may be automatically excluded from use for data storage and archiving during the time period for which the storage device information is gathered and processed using Equations 1. These values may be used to generate SET 404, which may then be used for automatic storage management and configuration of storage distribution.

For example, with R1, R2 as recorders and S1, S2, S3, and S4 as storages, assume the next statistics have been collected from the system: Utilization: S1 50%, S2 50%, S3 50%, S4 50%, Recording rate: R1 100%, R2 100%, Throughput: R1: S1 40%, S2 80%, S3 5%, S4 5%, R2: S1 5%, S2 5%, S3 30%, S4 45%, Free space: S1 50%, S2 100%, S3 40%, S4 60%, Availability rate: R1: S1 100%, S2 100%, S3 100%, S4 80%, R2: S1 80%, S2 10%, S3 100%, S4 100%, and C=150. In this example, with two data recorders R1 and R2 each connected to the same four storage devices S1, S2, S3, and S4, an exemplary SET after calculation of loss function values may appear as follows:

TABLE 1

|  | Storage 1 | Storage 2 | Storage 3 | Storage 4 | Total |
|---|---|---|---|---|---|
| Recorder 1 | 0.789 | 0.535 | 1.034 | 1.034 | 1.324 |
| Recorder 2 | 1.111 | 1.304 | 0.882 | 0.731 | 1.613 |

Thus, in the above Table 1, loss function values are calculated for each storage device on a per data recorder level, and those are added to SET 404. SET 404 may then be used to distribute storage of data recordings and other data. A threshold of 1 may be utilized to exclude all storage devices having values at or over 1 from being utilized for data storage during the time period or interval for which the storage device information is gathered. Thereafter, a ratio or percentage distribution may be provided over the remaining storage devices, where the ratio or percentage may favor those storage devices with lower loss function scores. After exclusion of those storages having a loss function value over 1 and thereafter determining a ratio or percentage distribution between the remaining storage devices, an exemplary table of distribution for the gathered storage device information (e.g., during a specific time period or interval) using the data from Table 1 may appear as follows:

TABLE 2

|  | Storage 1 | Storage 2 | Storage 3 | Storage 4 |
|---|---|---|---|---|
| Recorder 1 | 40% | 60% | 0% | 0% |
| Recorder 2 | 0% | 0% | 45% | 55% |

Using Equations 1 with Tables 1 and 2, in diagram 400, recorder 210 obtains one or more data recordings or other data for storage and archiving. Recorder 210 is then required to distribute those data recordings automatically and efficiently over available data storage devices on the distributed network. This may be distributed in a weighted round robin manner. Recorder 210 transmits a get request 406 to get storage distributions in order to determine storage devices to assign storage of the data recording(s). SLB manager 402 of SLB 214 receives get request 406, and performs an SET get operation 408 to obtain SET 404. This may include accessing SET 404 from a database and/or calculating SET 404. During an analysis operation 410, SLB manager 402 then analyzes SET 404 and makes a determination based on one or more of Tables 1 or 2. This information is then provided back to recorder 210 in a storage distribution assignment 412, which provides information for distribution of storage of the data recording(s) for recorder 210. Thus, SET 404 may be used for automatic storage management to optimize storage capacity, efficiency, and availability. Additionally, ML models may be trained to provide predictive classification of storage devices for data storage, such as based on training data associated with SET 404 and/or the operations of diagram 400.

When training ML models based on SET 404 and/or other SETs, as well as training data that may be associated with over-time distributions of storages by SLB 214 and/or other SLBs, one or more ML model algorithms and training frameworks may be used. ML models may include trained layers such that input features and corresponding data at an input layer yields or provides an output classification or decision at an output layer. ML models may include different layers, such as an input layer, one or more hidden layers, and an output layer, each having one or more nodes, however, different layers may also be utilized. For example, ML models may include as many hidden layers trained for classification and/or decision-making as necessary or appropriate. Nodes in each layer may be connected to nodes in an adjacent layer. In this example, ML models receive a set of input values for corresponding features and produce one or more output values, such as a classification and/or decision of distribution of storage over storage devices during different times based on different storage device information. However, different and/or more outputs may also be provided based on the training. When ML models are used to, each node in the input layer may correspond to a distinct attribute or input data type derived from the training data.

In some embodiments, each of the nodes in a hidden layer, when present, generates a representation, which may include a mathematical computation (or algorithm) that produces a value based on the input values of the input nodes. The mathematical computation may include assigning different weights to each of the data values received from the input nodes. The hidden layer nodes may include different algorithms and/or different weights assigned to the input data and may therefore produce a different value based on the input values. The values generated by the hidden layer nodes may be used by the output layer node to produce an output value. ML models may be separately trained using training data, where the nodes in the hidden layer may be trained (adjusted) such that an optimal output (e.g., a classification) is produced in the output layer based on the training data. By continuously providing different sets of training data and penalizing ML models when the output is incorrect, ML models (and specifically, the representations of the nodes in the hidden layer) may be trained (adjusted) to improve performance of the ML models in data classification. Adjusting ML models may include separately adjusting the weights associated with each node in the hidden layer.

Figure 5:
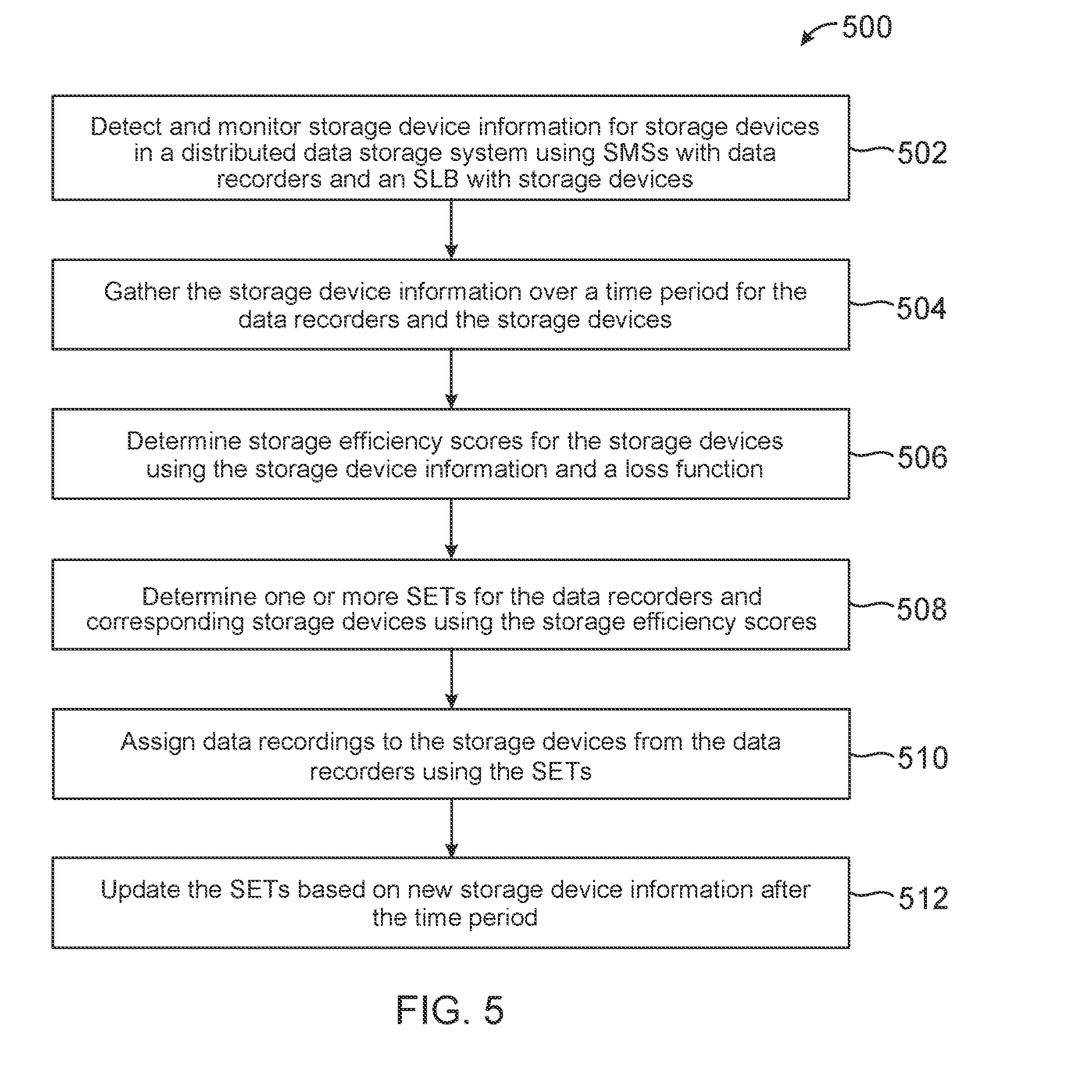
FIG. 5 is a simplified diagram of an exemplary flowchart for automatic storage management between data recorders and storage devices by a storage load balancer based on monitored statistics from storage monitoring services according to some embodiments.

FIG. 5 is a simplified diagram of an exemplary flowchart 500 for automatic storage management between data recorders and storage devices by a storage load balancer based on monitored statistics from storage monitoring services according to some embodiments. Note that one or more steps, processes, and methods described herein of flowchart 500 may be omitted, performed in a different sequence, or combined as desired or appropriate. Flowchart 500 of FIG. 5 includes operations for performing automatic storage management as discussed in reference to FIG. 1-4. One or more of the processes 502-512 of flowchart 500 may be implemented, at least in part, in the form of executable code stored on non-transitory, tangible, machine-readable media that when run by one or more processors may cause the one or more processors to perform one or more of the processes 502-512. In some embodiments, flowchart 500 can be performed by one or more computing devices discussed in environment 100 of FIG. 1, as well as those in diagrams 200, 300, and 400 of FIGS. 2-4.

At process 502, storage device information for storage devices in a distributed data storage system is detected and monitored using SMSs with data recorders and an SLB with storage devices. The storage device information may include statistics and other data monitored and collected from storage devices by SMSs on data recorders in communication with the storage devices, such as connection and/or performance parameters when communicating and/or storing data between those devices and/or servers. The storage device information may further include parameters for the storage devices that may be monitored and determined by the SLB in communication with the data recorders and storage devices. For example, the SLB may determine free space, storage utilization rate, IOPS, latency, throughput, load, and the like for each storage device.

At process 504, the storage device information is gathered over a time period for the data recorders and the storage devices. The storage device information may be gathered to determine parameters that may be used as input for a loss function to determine values or scores for data storage to each storage device by corresponding recorders when storing and/or archiving data. For example, the storage device information may include a storage utilization rate, a throughput, a storage availability, a storage free space, a recording rate, and/or a storage location. At process 506, storage efficiency scores for the storage devices are determined using the storage device information and a loss function. The loss function may correspond to a storage efficiency calculation, which may utilize one or more functions, algorithms, and/or models to calculate a storage efficiency of each storage device when assigning storage and archiving of a data recording or other data from a data recorder.

At process 508, one or more SETs for the data recorders and corresponding storage devices are determined using the storage efficiency scores. The SETs may correspond to data tables, which may be cached and/or semi-persistently or persistently stored for use by an SLB to assign storage devices to data recorders for data storage and/or archiving. The SETs may therefore reside with the SLB and may be used in response to data recorders requesting storage distribution information. However, the SETs may also be proliferated to down-chain devices and/or other devices and servers for use.

At process 510, data recordings are assigned to the storage devices from the data recorders using the SETs. The data recorders may ping or request distribution instructions for storage, where the SLB responds based on one or more corresponding SETs. The SETs may utilize a percentage distribution from available and qualifying data storages to assign distribution of data recordings and other data. Certain data storages may not qualify where their corresponding storage efficiency value or score is below a threshold value or score, such as if the storage efficiency value is too high and indicates that the storage device is too inefficient (or too low where a low value or score indicates low efficiency for data storage). Among the qualifying storage devices, a ratio or percentage distribution may be determined based on the corresponding values. This may be distributed in a weighted round robin manner.

At process 512, the SETs are updated based on new storage device information after the time period. As additional information is monitored and gathered by the SMSs and SLB s, the storage device information may change, such as in off hours or in busy hours. Thus, the SETs may be updated and changed, or new SETs may be generated, in order to account for changes in storage device information over time and during different time periods, times of the day/week, and/or based on different network and/or call center traffic. This may then affect the automatic distribution of storage in the data storage system to account for these changes.

As discussed above and further emphasized here, FIGS. 1, 2, 3, 4, and 5 are merely examples of SLB server 120 and corresponding methods for automatic storage management and distribution, which examples should not be used to unduly limit the scope of the claims. One of ordinary skill in the art would recognize many variations, alternatives, and modifications.

Figure 6:
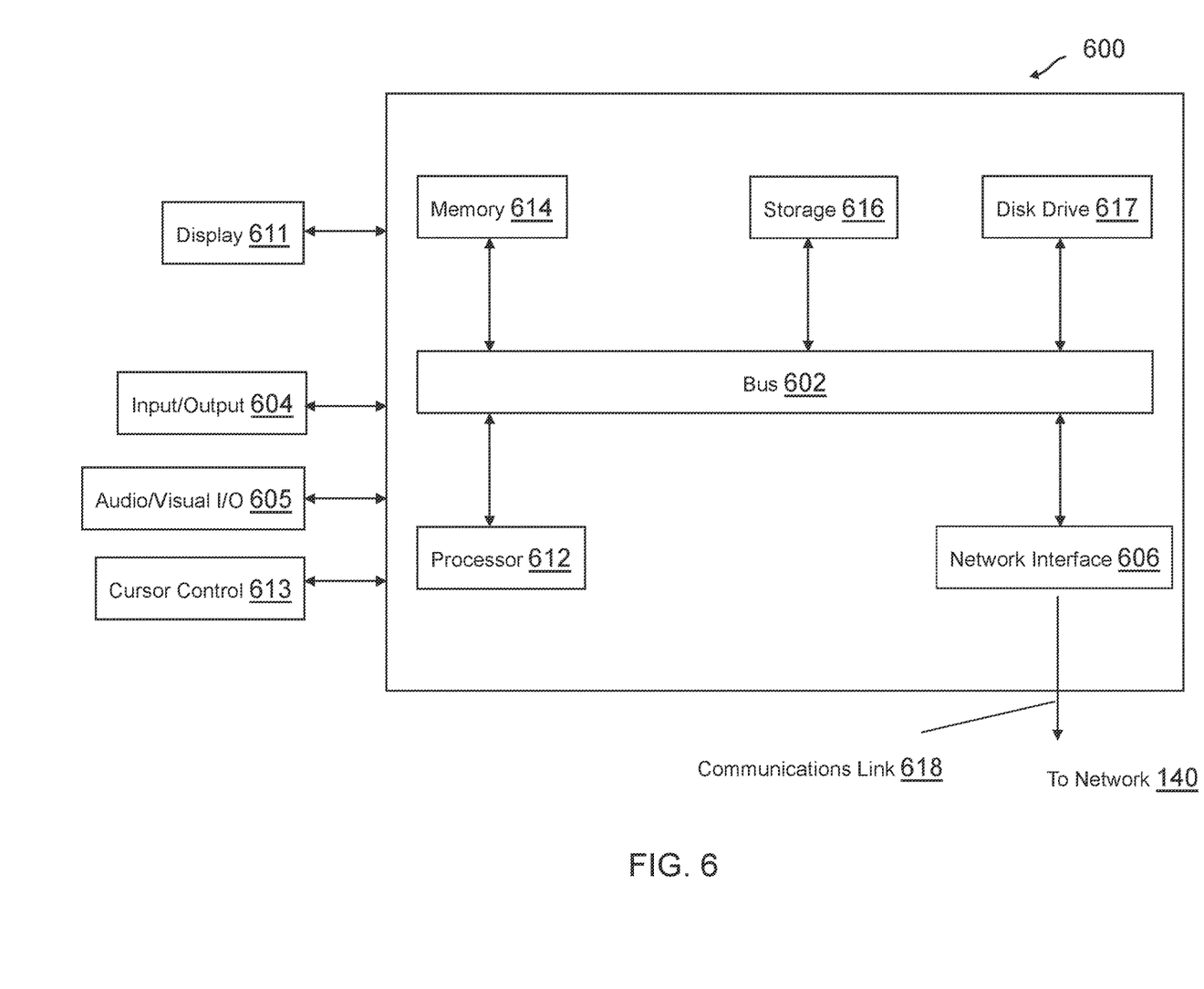
FIG. 6 is a simplified diagram of a computing device according to some embodiments.

FIG. 6 is a block diagram of a computer system suitable for implementing one or more components in FIG. 1, according to an embodiment. In various embodiments, the communication device may include a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio/visual input/output component 605 may also be included to allow a user to use voice for inputting information by converting audio signals. Audio/visual I/O component 605 may allow the user to hear audio, and well as input and/or output video. A transceiver or network interface 606 transmits and receives signals between computer system 600 and other devices, such as another communication device, service device, or a service provider server via network 140. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that include bus 602. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. A data storage system configured to optimize selection of a plurality of data storage devices of the data storage system, the data storage system comprising:
   a processor and a non-transitory computer readable medium operably coupled thereto, the computer readable medium comprising a plurality of instructions stored in association therewith that are accessible to, and executable by, the processor, to perform storage device selection operations which comprise:
   detecting, using a storage monitoring service for a first data recorder, storage device information for storing data recordings from the first data recorder to each of the plurality of data storage devices of the data storage system;
   gathering, by a storage load balancer comprising at least one storage efficiency table, the storage device information for the first data recorder with the plurality of data storage devices from the storage monitoring service;
   determining, by the storage load balancer, a plurality of storage efficiency scores for storing the data recordings with the plurality of data storage devices by the first data recorder using a loss function and the gathered storage device information;
   generating, by the storage load balancer, a storage efficiency table for the first data recorder based on the plurality of storage efficiency scores; and
   assigning, by the storage load balancer, a first data recording from the first data recorder to one of the plurality of data storage devices based on the storage efficiency table and an efficiency score threshold for the plurality of storage efficiency scores, wherein assigning the data recordings including the first data recording and at least one second data recording from the first data recorder to the plurality of data storage devices using the at least one storage efficiency table and a weighted round-robin technique for the plurality of data storage devices.

2. The data storage system of claim 1, wherein, before the assigning of the first data recording, the storage device selection operations further comprise:
   determining a storage machine learning (ML) model for at least the first data recorder that predicts one or more assignments of the data recordings from the first data recorder to the plurality of data storage devices,
   wherein the assigning of the first data recording to the one of the plurality of data storage devices is further based on the storage ML model.

3. The data storage system of claim 2, wherein, before the assigning of the first data recording, the storage device selection operations further comprise:
   training the storage ML model for at least the first data recorder of the data storage system using at least one of the storage device information or the storage efficiency table.

4. The data storage system of claim 1, wherein the assigning is further based on a system load for data storage by the data storage system with the plurality of data storage devices, and wherein the assigning maximizes one of data storage efficiencies or device stabilities for the plurality of data storage devices based on the system load.

5. The data storage system of claim 1, wherein the storage device information for each of the plurality of data storage devices with the first data recorder comprises at least one of a storage utilization rate, a data storage throughput, a storage availability, a storage free space, a recording rate, a storage location, or a combination thereof.

6. The data storage system of claim 1, wherein the storage efficiency table further comprises a plurality of additional storage efficiency scores for at least a second data recorder of the data storage system with the plurality of data storage devices, and wherein the plurality of additional storage efficiency scores are separate from the plurality of storage efficiency scores for the first data recorder.

7. The data storage system of claim 1, wherein the data recordings comprise at least one of voice call data, computing device screen data, text data, video data, or interaction-related call data, and wherein the data recordings are stored in a buffer of the first data recorder from call center communications.

8. A method to optimize selection of a plurality of data storage devices of a data storage system, the method comprising:
   detecting, using a storage monitoring service for a first data recorder, storage device information for storing data recordings from the first data recorder to each of the plurality of data storage devices of the data storage system;
   gathering, by a storage load balancer comprising at least one storage efficiency table, the storage device information for the first data recorder with the plurality of data storage devices from the storage monitoring service;

determining, by the storage load balancer, a plurality of storage efficiency scores for storing the data recordings with the plurality of data storage devices by the first data recorder using a loss function and the gathered storage device information;

generating, by the storage load balancer, a storage efficiency table for the first data recorder based on the plurality of storage efficiency scores; and assigning, by the storage load balancer, a first data recording from the first data recorder to one of the plurality of data storage devices based on the storage efficiency table and an efficiency score threshold for the plurality of storage efficiency scores, wherein assigning the data recordings including the first data recording and at least one second data recording from the first data recorder to the plurality of data storage devices using the at least one storage efficiency table and a weighted round-robin technique for the plurality of data storage devices.

9. The method of claim 8, wherein, before the assigning of the first data recording, the method further comprises:

determining a storage machine learning (ML) model for at least the first data recorder that predicts one or more assignments of the data recordings from the first data recorder to the plurality of data storage devices, wherein the assigning of the first data recording to the one of the plurality of data storage devices is further based on the storage ML model.

10. The method of claim 9, wherein, before the assigning of the first data recording, the method further comprises:

training the storage ML model for at least the first data recorder of the data storage system using at least one of the storage device information or the storage efficiency table.

11. The method of claim 8, wherein the assigning is further based on a system load for data storage by the data storage system with the plurality of data storage devices, and wherein the assigning maximizes one of data storage efficiencies or device stabilities for the plurality of data storage devices based on the system load.

12. The method of claim 8, wherein the storage device information for each of the plurality of data storage devices with the first data recorder comprises at least one of a storage utilization rate, a data storage throughput, a storage availability, a storage free space, a recording rate, a storage location, or a combination thereof.

13. The method of claim 8, wherein the storage efficiency table further comprises a plurality of additional storage efficiency scores for at least a second data recorder of the data storage system with the plurality of data storage devices, and wherein the plurality of additional storage efficiency scores are separate from the plurality of storage efficiency scores for the first data recorder.

14. The method of claim 8, wherein the data recordings comprise at least one of voice call data, computing device screen data, text data, video data, or interaction-related call data, and wherein the data recordings are stored in a buffer of the first data recorder from call center communications.

15. A non-transitory computer-readable medium having stored thereon computer-readable instructions executable to optimize selection of a plurality of data storage devices of a data storage system, the computer-readable instructions executable to perform storage device selection operations which comprises:

detecting, using a storage monitoring service for a first data recorder, storage device information for storing data recordings from the first data recorder to each of the plurality of data storage devices of the data storage system;

gathering, by a storage load balancer comprising at least one storage efficiency table, the storage device information for the first data recorder with the plurality of data storage devices from the storage monitoring service;

determining, by the storage load balancer, a plurality of storage efficiency scores for storing the data recordings with the plurality of data storage devices by the first data recorder using a loss function and the gathered storage device information;

generating, by the storage load balancer, a storage efficiency table for the first data recorder based on the plurality of storage efficiency scores; and assigning, by the storage load balancer, a first data recording from the first data recorder to one of the plurality of data storage devices based on the storage efficiency table and an efficiency score threshold for the plurality of storage efficiency scores, wherein assigning the data recordings including the first data recording and at least one second data recording from the first data recorder to the plurality of data storage devices using the at least one storage efficiency table and a weighted round-robin technique for the plurality of data storage devices.

16. The non-transitory computer-readable medium of claim 15, wherein, before the assigning of the first data recording, the storage device selection operations further comprise:

determining a storage machine learning (ML) model for at least the first data recorder that predicts one or more assignments of the data recordings from the first data recorder to the plurality of data storage devices, wherein the assigning of the first data recording to the one of the plurality of data storage devices is further based on the storage ML model.

17. The non-transitory computer-readable medium of claim 16, wherein, before the assigning of the first data recording, the storage device selection operations further comprise:

training the storage ML model for at least the first data recorder of the data storage system using at least one of the storage device information or the storage efficiency table.

* * * * *